(12) United States Patent
Hayashi et al.

(10) Patent No.: US 11,266,882 B2
(45) Date of Patent: *Mar. 8, 2022

(54) GOLF BALL

(71) Applicant: Sumitomo Rubber Industries, Ltd., Kobe (JP)

(72) Inventors: Kai Hayashi, Kobe (JP); Kazuyoshi Shiga, Kobe (JP); Hikaru Nagakura, Kobe (JP); Takahiro Shigemitsu, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 111 days.

This patent is subject to a terminal disclaimer.

(21) Appl. No.: 16/667,420

(22) Filed: Oct. 29, 2019

(65) Prior Publication Data

US 2020/0129815 A1  Apr. 30, 2020

(30) Foreign Application Priority Data

Oct. 30, 2018  (JP) .............................. JP2018-204319

(51) Int. Cl.
*A63B 37/00* (2006.01)
*A63B 37/02* (2006.01)
*C08L 9/00* (2006.01)

(52) U.S. Cl.
CPC ...... *A63B 37/0076* (2013.01); *A63B 37/0063* (2013.01); *A63B 37/0075* (2013.01); *C08L 9/00* (2013.01); *A63B 37/0039* (2013.01); *A63B 37/0043* (2013.01); *A63B 37/0051* (2013.01); *A63B 37/0064* (2013.01); *A63B 37/0092* (2013.01)

(58) Field of Classification Search
None
See application file for complete search history.

(56) References Cited

U.S. PATENT DOCUMENTS

| | | | | |
|---|---|---|---|---|
| 4,373,041 A * | 2/1983 | Wood | ...................... | C08K 5/548 524/270 |
| 4,955,966 A * | 9/1990 | Yuki | .................. | A63B 37/0051 473/359 |
| 5,697,856 A * | 12/1997 | Moriyama | ......... | A63B 37/0003 473/374 |
| 5,711,723 A * | 1/1998 | Hiraoka | ............. | A63B 37/0003 473/374 |
| 6,287,218 B1 * | 9/2001 | Ohama | .............. | A63B 37/0003 473/377 |
| 6,575,850 B1 | 6/2003 | Iwami et al. | | |
| 10,940,368 B2 * | 3/2021 | Nagakura | .......... | A63B 37/0074 |
| 11,097,162 B2 * | 8/2021 | Nagakura | .......... | A63B 37/0051 |
| 2001/0031670 A1 * | 10/2001 | Iwami | ................ | A63B 37/0003 473/371 |
| 2005/0137030 A1 | 6/2005 | Sullivan | | |
| 2006/0264269 A1 | 11/2006 | Rajagopalan et al. | | |
| 2007/0129172 A1 | 6/2007 | Cavallaro | | |
| 2020/0101354 A1 * | 4/2020 | Nagakura | .......... | A63B 37/0062 |
| 2020/0206573 A1 * | 7/2020 | Takihara | ............ | A63B 37/0063 |
| 2020/0206574 A1 * | 7/2020 | Inoue | ...................... | C08L 23/12 |
| 2020/0206576 A1 * | 7/2020 | Takihara | ............ | A63B 37/0054 |

FOREIGN PATENT DOCUMENTS

| | | |
|---|---|---|
| JP | 63-54181 A | 3/1988 |
| JP | 2001-137386 A | 5/2001 |
| JP | 2005-185836 A | 7/2005 |
| JP | 2006-320725 A | 11/2006 |
| JP | 2008-126062 A | 6/2008 |
| JP | 2016-19620 A | 2/2016 |

OTHER PUBLICATIONS

PINOVA product information for PiccolyteA115 (2011) pp. 1-2. (Year: 2011).*

* cited by examiner

*Primary Examiner* — David J Buttner
(74) *Attorney, Agent, or Firm* — Birch, Stewart, Kolasch & Birch, LLP

(57) ABSTRACT

An object of the present invention is to provide a golf ball having excellent durability. The present invention provides a golf ball comprising a spherical core composed of an inner core layer and an outer core layer, and at least one cover covering the spherical core, wherein the inner core layer is formed from an inner core layer rubber composition containing (a) a base rubber, (b) an α,β-unsaturated carboxylic acid having 3 to 8 carbon atoms and/or a metal salt thereof as a co-crosslinking agent, (c) a crosslinking initiator, and (d) a terpene-based resin.

21 Claims, 1 Drawing Sheet

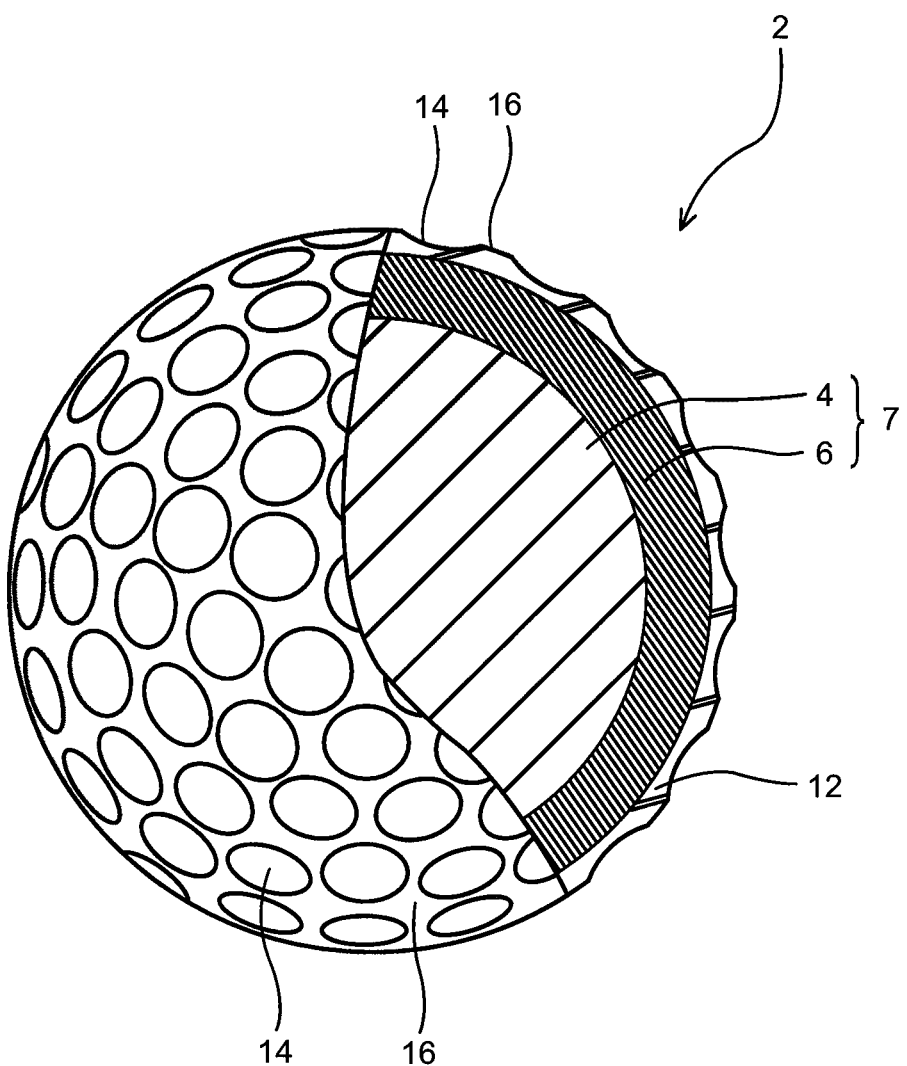

GOLF BALL

FIELD OF THE INVENTION

The present invention relates to a golf ball, more specifically relates to an improvement in a core of a golf ball.

DESCRIPTION OF THE RELATED ART

As a material for forming a core of a golf ball, a rubber composition containing a base rubber, a co-crosslinking agent, and a crosslinking initiator is widely used, in light of its good resilience.

For example, JP 2016-019620 A discloses a golf ball comprising a spherical core and at least one cover covering the spherical core, wherein the spherical core is formed from a rubber composition containing (a) a base rubber, (b) an α,β-unsaturated carboxylic acid having 3 to 8 carbon atoms and/or a metal salt thereof as a co-crosslinking agent, (c) a crosslinking initiator and (d) a petroleum resin, and further containing (e) a metal compound in case that (b) the co-crosslinking agent consists of the α,β-unsaturated carboxylic acid having 3 to 8 carbon atoms.

In addition, JP S63-54181 A discloses a golf ball comprising a core, wherein the core is composed of a viscoelastic material having a rebound resilience (based on JIS K 630) of 40% or less and an interior loss coefficient tan δ showing a maximum value of 0.3 or more at a range of from 0° C. to 40° C., and a constituent material of the core is a rubber composition obtained by blending an ordinary additive such as a vulcanization agent, a vulcanization accelerator, a lubricant or a plasticizer, and further a large amount of a filler, a softening agent or a resin such as a petroleum resin or a terpene resin into butyl rubber, ethylene-propylene-diene terpolymer, high styrene rubber, ethylene-propylene rubber, styrene-butadiene rubber, acrylonitrile-butadiene rubber or norbornene polymer.

JP 2008-126062 A discloses a multipiece golf ball comprising at least three core layers including a center, an inner core layer and an outer core layer, at least one cover, and at least one water vapor barrier layer disposed between the outer core layer and the at least one cover to realize greater water vapor permeability than the cover, wherein a hardness gradient is provided to the center, the inner core layer and the outer core layer, and discloses a terpene resin, a terpene resin ester or the like may be added in the water vapor barrier layer.

JP 2006-320725 A discloses a golf ball comprising a core, an intermediate layer and a cover, wherein the intermediate layer is produced from a composition containing an ionomer resin and a rosin material having a softening point of at least about 50° C.

JP 2005-185836 A discloses a golf ball comprising a core and a cover, wherein at least one of the core and the cover contains a plasticized polyurethane composition containing at least one polyurethane and at least one plasticizer.

JP 2001-137386 A discloses a golf ball comprising a core and a cover, wherein the cover has a loss tangent (tan δ) value in a range of from 0.15 to 0.70 at −10° C. in a temperature distribution curve for dynamic viscoelasticity measured in a tensile mode under conditions of temperature rising rate: 4° C./min, frequency: 10 Hz, initial strain: 1.0 mm, and the cover composition contains a material consisting of an ionomer resin, or a mixed material primarily containing an ionomer resin and further containing one or at least two elastomers having a rubber element, and a terpene resin and/or a rosin ester resin used as a tackifier.

SUMMARY OF THE INVENTION

In a spherical core obtained by heating a core rubber composition at a temperature of about 150° C. to 170° C. for about 10 min to 30 min, a hardness difference is generated between the surface hardness and the center hardness. It is considered that this is because a temperature distribution is generated inside the spherical core such that a difference in the curing reaction of the rubber composition occurs at the core surface portion and the core center portion. The spherical core having a hardness difference between the surface hardness and the center hardness lowers the spin rate of the golf ball. The golf ball having a low spin rate travels a great flight distance on driver shots.

On the other hand, the spherical core having a low hardness difference between the surface hardness and the center hardness improves the durability of the golf ball. The spherical core having a low hardness difference between the surface hardness and the center hardness was necessarily obtained by a heat molding at a low temperature of about 120° C. to 130° C. for 60 min to 90 min. In other words, in the production of the spherical core having a low hardness difference between the surface hardness and the center hardness, there was a problem that the production time was long. The present invention has been achieved in view of the above problems. An object of the present invention is to provide a golf ball comprising a novel spherical core (especially an inner core layer) having a low hardness difference between the surface hardness and the center hardness.

The present invention provides a golf ball comprising a spherical core composed of an inner core layer and an outer core layer, and at least one cover covering the spherical core, wherein the inner core layer is formed from an inner core layer rubber composition containing (a) a base rubber, (b) an α,β-unsaturated carboxylic acid having 3 to 8 carbon atoms and/or a metal salt thereof as a co-crosslinking agent, (c) a crosslinking initiator, and (d) a terpene-based resin.

According to the present invention, a golf ball comprising a novel spherical core (an inner core layer) having a low hardness difference between the surface hardness and the center hardness is obtained. In addition, the production efficiency of the above described golf ball can be improved.

BRIEF DESCRIPTION OF THE DRAWINGS

The FIGURE is a partially cutaway cross-sectional view of a golf ball according to one embodiment of the present invention.

DESCRIPTION OF THE PREFERRED EMBODIMENT

The present invention provides a golf ball comprising a spherical core composed of an inner core layer and an outer core layer, and at least one cover covering the spherical core, wherein the inner core layer is formed from an inner core layer rubber composition containing (a) a base rubber, (b) an α,β-unsaturated carboxylic acid having 3 to 8 carbon atoms and/or a metal salt thereof as a co-crosslinking agent, (c) a crosslinking initiator, and (d) a terpene-based resin.

The inner core layer rubber composition used in the present invention will be described.

[(a) Base Rubber]

As the base rubber, a natural rubber and/or a synthetic rubber may be used. For example, polybutadiene rubber, natural rubber, polyisoprene rubber, styrene polybutadiene rubber, or ethylene-propylene-diene rubber (EPDM) may be used. These rubbers may be used solely or in combination of at least two of them. Among them, typically preferable is a high-cis polybutadiene having a cis-1,4 bond in an amount of 40 mass % or more, preferably 80 mass % or more, and more preferably 90 mass % or more in view of its superior resilience property.

The high-cis polybutadiene preferably has a 1,2-vinyl bond in an amount of 2 mass % or less, more preferably 1.7 mass % or less, and even more preferably 1.5 mass % or less. If the amount of the 1,2-vinyl bond is excessively high, the resilience may be lowered.

The high-cis polybutadiene is preferably one synthesized using a rare-earth element catalyst. When a neodymium catalyst employing a neodymium compound which is a lanthanum series rare-earth element compound, is used, a polybutadiene rubber having a high amount of the cis-1,4 bond and a low amount of the 1,2-vinyl bond is obtained with an excellent polymerization activity, and thus such polybutadiene rubber is particularly preferable.

The high-cis polybutadiene preferably has a Mooney viscosity ($ML_{1+4}$ (100° C.)) of 30 or more, more preferably 32 or more, and even more preferably 35 or more, and preferably has a Mooney viscosity ($ML_{1+4}$ (100° C.)) of 140 or less, more preferably 120 or less, even more preferably 100 or less, and most preferably 80 or less. It is noted that the Mooney viscosity ($ML_{1+4}$ (100° C.)) in the present invention is a value measured according to JIS K6300 using an L rotor under the conditions of preheating time: 1 minute, rotor rotation time: 4 minutes, and temperature: 100° C.

The high-cis polybutadiene preferably has a molecular weight distribution Mw/Mn (Mw: weight average molecular weight, Mn: number average molecular weight) of 2.0 or more, more preferably 2.2 or more, even more preferably 2.4 or more, and most preferably 2.6 or more, and preferably has a molecular weight distribution Mw/Mn of 6.0 or less, more preferably 5.0 or less, even more preferably 4.0 or less, and most preferably 3.4 or less. If the molecular weight distribution (Mw/Mn) of the high-cis polybutadiene is excessively low, the processability may deteriorate, and if the molecular weight distribution (Mw/Mn) of the high-cis polybutadiene is excessively high, the resilience may be lowered. It is noted that the molecular weight distribution is measured by gel permeation chromatography ("HLC-8120GPC" available from Tosoh Corporation) using a differential refractometer as a detector under the conditions of column: GMHHXL (available from Tosoh Corporation), column temperature: 40° C., and mobile phase: tetrahydrofuran, and calculated by converting based on polystyrene standard.

In the present invention, (a) the base rubber preferably contains a polybutadiene, more preferably contains a high-cis polybutadiene having a cis-1,4 bond in a proportion of 90 mass % or more (hereinafter sometimes simply referred to "high-cis polybutadiene").

[(b) Co-Crosslinking Agent]

(b) The α,β-unsaturated carboxylic acid having 3 to 8 carbon atoms and/or the metal salt thereof used in the inner core layer rubber composition is blended as a co-crosslinking agent in the rubber composition, and has an action of crosslinking a rubber molecule by graft polymerization to a base rubber molecular chain.

Examples of the α,β-unsaturated carboxylic acid having 3 to 8 carbon atoms include acrylic acid, methacrylic acid, fumaric acid, maleic acid, and crotonic acid.

Examples of the metal constituting the metal salt of the α,β-unsaturated carboxylic acid having 3 to 8 carbon atoms include a monovalent metal ion such as sodium, potassium, and lithium; a divalent metal ion such as magnesium, calcium, zinc, barium, and cadmium; a trivalent metal ion such as aluminum; and other metal ions such as tin, and zirconium. The metal component may be used solely or as a mixture of at least two of them. Among them, as the metal component, the divalent metal such as magnesium, calcium, zinc, barium, and cadmium is preferable. This is because use of the divalent metal salt of the α,β-unsaturated carboxylic acid having 3 to 8 carbon atoms easily generates a metal crosslinking between the rubber molecules. Especially, as the divalent metal salt, zinc acrylate is preferable, because zinc acrylate enhances the resilience of the resultant golf ball. The α,β-unsaturated carboxylic acid having 3 to 8 carbon atoms and/or the metal salt thereof may be used solely or in combination of at least two of them.

The amount of (b) the α,β-unsaturated carboxylic acid having 3 to 8 carbon atoms and/or the metal salt thereof is preferably 15 parts by mass or more, more preferably 20 parts by mass or more, and even more preferably 25 parts by mass or more, and is preferably 50 parts by mass or less, more preferably 45 parts by mass or less, and even more preferably 35 parts by mass or less, with respect to 100 parts by mass of (a) the base rubber. If the amount of (b) the α,β-unsaturated carboxylic acid having 3 to 8 carbon atoms and/or the metal salt thereof is less than 15 parts by mass, the amount of (c) the crosslinking initiator which will be explained below must be increased in order to obtain an appropriate hardness of the core formed from the core rubber composition, which tends to lower the resilience of the obtained golf ball. On the other hand, if the amount of the α,β-unsaturated carboxylic acid having 3 to 8 carbon atoms and/or the metal salt thereof is more than 50 parts by mass, the core formed from the core rubber composition becomes so hard that the shot feeling of the obtained golf ball may be lowered.

[(c) Crosslinking Initiator]

(c) The crosslinking initiator used in the inner core layer rubber composition is blended in order to crosslink (a) the base rubber component. As (c) the crosslinking initiator, an organic peroxide is preferable. Specific examples of the organic peroxide include an organic peroxide such as dicumyl peroxide, 1,1-bis(t-butylperoxy)-3,3,5-trimethylcyclohexane, 2,5-dimethyl-2,5-di(t-butylperoxy)hexane, and di-t-butylperoxide. These organic peroxides may be used solely or in combination of at least two of them. Among them, dicumyl peroxide is preferably used.

The amount of (c) the crosslinking initiator is preferably 0.2 part by mass or more, more preferably 0.5 part by mass or more, and even more preferably 0.7 part by mass or more, and is preferably 5.0 parts by mass or less, more preferably 2.5 parts by mass or less, and even more preferably 2.0 parts by mass or less, with respect to 100 parts by mass of (a) the base rubber. If the amount of the crosslinking initiator is less than 0.2 part by mass, the inner core layer formed from the inner core layer rubber composition becomes so soft that the resilience of the obtained golf ball may be lowered. If the amount of (c) the crosslinking initiator is more than 5.0 parts by mass, the amount of (b) the co-crosslinking agent which has been explained above must be decreased in order to obtain an appropriate hardness of the inner core layer formed from the inner core layer rubber composition, which may lower the resilience of the obtained golf ball or worsen the durability of the obtained golf ball.

[(d) Terpene-Based Resin]

The terpene-based resin used in the present invention is not particularly limited, as long as it is a polymer having a terpene compound as a constituent component. The terpene-based resin is preferably, for example, at least one member selected from the group consisting of a terpene polymer, a terpene-phenol copolymer, a terpene-styrene copolymer, a terpene-phenol-styrene copolymer, a hydrogenated terpene-phenol copolymer, a hydrogenated terpene-styrene copolymer, and a hydrogenated terpene-phenol-styrene copolymer.

The terpene polymer is a homopolymer obtained by polymerizing a terpene compound. The terpene compound includes a hydrocarbon represented by a composition of $(C_5H_8)_n$, and an oxygen-containing derivative thereof, and is a compound having a terpene such as monoterpene $(C_{10}H_{16})$, sesquiterpene $(C_{15}H_{24})$ or diterpene $(C_{20}H_{32})$ as a basic skeleton. Examples of the terpene compound include α-pinene, β-pinene, dipentene, limonene, myrcene, alloocimene, ocimene, α-phellandrene, α-terpinene, γ-terpinene, terpinolene, 1,8-cineole, 1,4-cineole, α-terpineol, β-terpineol, and γ-terpineol. The terpene compound may be used solely or used as a mixture of two or more of them.

The terpene polymer is obtained, for example, by polymerizing the above terpene compound. Examples of the terpene polymer include α-pinene polymer, β-pinene polymer, limonene polymer, dipentene polymer, and β-pinene/limonene polymer.

The terpene-phenol copolymer (hereinafter sometimes simply referred to as "terpene-phenolic resin") is, for example, a copolymer of the above terpene compound and a phenol-based compound. Examples of the phenol-based compound include phenol, cresol, xylenol, catechol, resorcin, hydroquinone, and bisphenol A. As the terpene-phenol copolymer, the copolymer of the above terpene compound and phenol is preferable.

The acid value of the terpene-phenol copolymer is preferably 10 mgKOH/g or more, more preferably 35 mgKOH/g or more, and even more preferably 60 mgKOH/g or more. In addition, the acid value of the terpene-phenol copolymer is preferably 300 mgKOH/g or less, more preferably 250 mgKOH/g or less, even more preferably 200 mgKOH/g or less, particularly preferably 150 mgKOH/g or less, and most preferably 90 mgKOH/g or less. It is noted that, in the present invention, the acid value of the terpene-phenol copolymer is an amount in milligram of potassium hydroxide required for neutralizing the acid included in one gram of the terpene-phenol copolymer, and is a value measured by a potentiometric titration method (JIS K 0070: 1992).

The hydroxy value of the terpene-phenol copolymer is preferably 30 mgKOH/g or more, more preferably 50 mgKOH/g or more. The hydroxy value of the terpene-phenol copolymer is preferably 150 mgKOH/g or less, more preferably 100 mgKOH/g or less. It is noted that, in the present specification, the hydroxy value is an amount in milligram of potassium hydroxide required tor neutralizing acetic acid bonding to hydroxyl group when one gram of the resin is acetylated, and is a value measured by a potentiometric titration method (JIS K 0070: 1992).

The terpene-styrene copolymer is, for example, a copolymer of the above terpene compound and a styrene-based compound. Examples of the styrene-based compound include styrene, and α-methylstyrene. As the terpene-styrene copolymer, the copolymer of the above terpene compound and α-methylstyrene is preferable.

The terpene-phenol-styrene copolymer is, for example, a copolymer of the above terpene compound, the above phenolic compound and the above styrene-based compound. As the terpene-phenol-styrene copolymer, the copolymer of the above terpene compound, phenol and α-methylstyrene is preferable.

The hydrogenated terpene-phenol copolymer is one obtained by hydrogenating the above terpene-phenol copolymer. The hydrogenated terpene-styrene copolymer is one obtained by hydrogenating the above terpene-styrene copolymer. The hydrogenated terpene-phenol-styrene copolymer is one obtained by hydrogenating the above terpene-phenol-styrene copolymer.

As (d) the terpene-based resin, at least one member selected from the group consisting of compounds having a structure represented by the following formulae (1) to (4) is preferable.

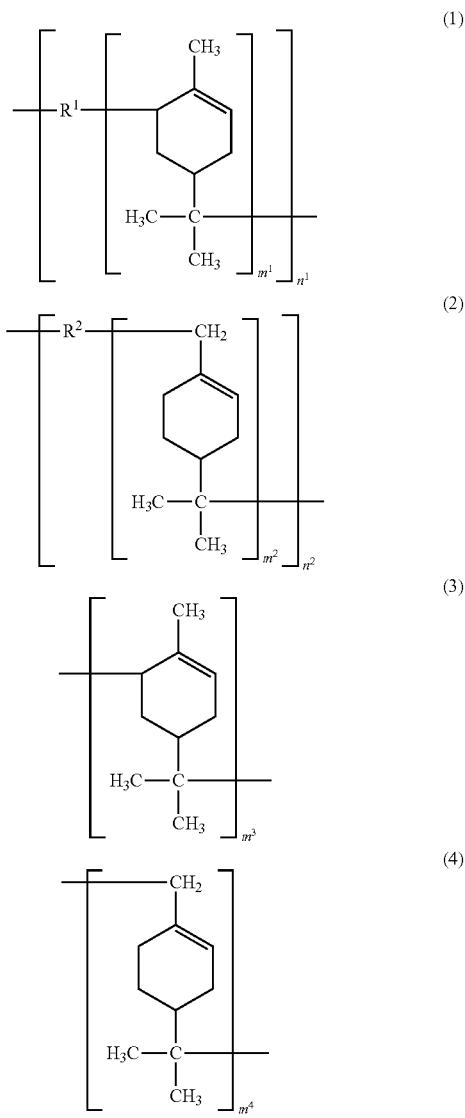

[In the formulae (1) to (4), $R^1$ and $R^2$ each independently represent a divalent residue of a phenol-based compound and/or a styrene-based compound, $m^1$ to $m^4$ each independently represent a natural number of 1 to 30, and $n^1$ to $n^2$ each independently represent a natural number of 1 to 20.]

The compounds having the structure represented by the above formulae (1) to (4) each have a structure derived from pinene in the molecule.

The compound having the structure represented by the formula (1) has a repeating unit consisting of a structural moiety derived from α-pinene and $R^1$ bonding to the structural moiety derived from α-pinene. $R^1$ is preferably a divalent residue where two hydrogen atoms are removed from benzene ring of a phenol-based compound and/or a styrene-based compound. Examples of the compound having the structure represented by the formula (1) include a copolymer of α-pinene and a phenol-based compound and/or a styrene-based compound.

Examples of the phenol-based compound include phenol, cresol, xylenol, catechol, resorcin, hydroquinone, and bisphenol A. Examples of the styrene-based compound include styrene, and α-methylstyrene.

In the formula (1), $m^1$ represents the degree of polymerization of the structural unit derived from α-pinene, and is preferably a natural number of 1 to 30. $m^1$ is preferably 1 or more, more preferably 2 or more, and even more preferably 3 or more, and is preferably 30 or less, more preferably 25 or less, and even more preferably 20 or less.

In the formula (1), $n^1$ represents the degree of polymerization of the repeating unit consisting of the structural moiety derived from α-pinene and $R^1$ bonding to the structural moiety derived from α-pinene, and is preferably a natural number of 1 to 20. $n^1$ is preferably 1 or more, more preferably 2 or more, and even more preferably 3 or more, and is preferably 20 or less, more preferably 18 or less, and even more preferably 15 or less.

The compound having the structure represented by the formula (2) has a repeating unit consisting of a structural moiety derived from β-pinene and $R^2$ bonding to the structural moiety in the molecule. Examples of the compound having the structure represented by the formula (2) include a copolymer of β-pinene and a phenol-based compound and/or a styrene-based compound. $R^2$ is a divalent residue where two hydrogen atoms are removed from benzene ring of a phenol-based compound and/or a styrene-based compound.

Examples of the phenol-based compound include phenol, cresol, xylenol, catechol, resorcin, hydroquinone, and bisphenol A. Examples of the styrene-based compound include styrene, and α-methylstyrene.

In the formula (2), $m^2$ represents the degree of polymerization of the structural unit derived from β-pinene, and is preferably a natural number of 1 to 30. $m^2$ is preferably 1 or more, more preferably 2 or more, and even more preferably 3 or more, and is preferably 30 or less, more preferably 25 or less, and even more preferably 20 or less.

In the formula (2), $n^2$ represents the degree of polymerization of the repeating unit consisting of a structural moiety derived from β-pinene and $R^2$ bonding to the structural moiety, and is preferably a natural number of 1 to 20. $n^2$ is preferably 1 or more, more preferably 2 or more, and even more preferably 3 or more, and is preferably 20 or less, more preferably 18 or less, and even more preferably 15 or less.

The compound having the structure represented by the formula (3) is a polymer having a structural unit derived from α-pinene, and is more preferably a polymer consisting of the structural unit derived from α-pinene.

In the formula (3), $m^3$ represents the degree of polymerization of the structural unit derived from α-pinene, and is preferably a natural number of 1 to 30. $m^3$ is preferably 1 or more, more preferably 2 or more, and even more preferably 3 or more, and is preferably 30 or less, more preferably 25 or less, and even more preferably 20 or less.

The compound having the structure represented by the formula (4) is a β-pinene polymer having a structural unit derived from β-pinene in the molecule, and is more preferably a polymer consisting of the structural unit derived from β-pinene.

In the formula (4), $m^4$ represents the degree of polymerization of the structural unit derived from β-pinene, and is preferably a natural number of 1 to 30. $m^4$ is preferably 1 or more, more preferably 2 or more, and even more preferably 3 or more, and is preferably 30 or less, more preferably 25 or less, and even more preferably 20 or less.

(d) The terpene-based resin preferably includes at least one member selected from the group consisting of α-pinene-phenol copolymer, α-pinene-α-methylstyrene copolymer, α-pinene-α-methylstyrene-phenol copolymer, β-pinene-phenol copolymer, β-pinene-α-methylstyrene copolymer, and β-pinene-α-methylstyrene-phenol copolymer. As (d) the terpene-based resin, these copolymers may be used solely, or two or more of them may be used in combination.

The softening point of (d) the terpene-based resin is preferably 60° C. or more, more preferably 80° C. or more, and even more preferably 100° C. or more, and is preferably 150° C. or less, more preferably 130° C. or less, and even more preferably 120° C. or less. This is because use of (d) the terpene-based resin having the softening point falling within the above range improves the dispersibility of the resin during kneading the rubber. It is noted that the softening point of (d) the terpene-based resin is measured with a ring and ball type softening point measuring apparatus according to JIS K 6220-1: 2001, and is a temperature at which the ball drops.

As (d) the terpene-based resin, a commercial product can be used. Examples of the commercial product include Sylvares TP2019, Sylvares TP7042, Sylvares TR7115, Sylvares TR7125 and Sylvatraxx 6720 available from Kraton Corporation; and YS RESIN PX 1150N and YS RESIN PX 1250 available from Yasuhara Chemical Co. Ltd.

The amount of (d) the terpene-based resin is preferably 3 parts by mass or more, more preferably 4 parts by mass or more, and even more preferably 5 parts by mass or more, and is preferably 20 parts by mass or less, more preferably 18 parts by mass or less, and even more preferably 15 parts by mass or less, with respect to 100 parts by mass of (a) the base rubber. If the amount of the component (d) is less than 3 parts by mass, the effect of adding the component (d) is small, and thus the improvement effect on the shot feeling on driver shots may not be obtained. On the other hand, if the amount of the component (d) is more than 20 parts by mass, the obtained core becomes excessively soft as a whole, and thus the resilience may be lowered.

The blending ratio (the component (b)/the component (d)) of the component (b) to the component (d) is preferably 2.0 or more, more preferably 2.5 or more, and even more preferably 2.8 or more, and is preferably 15.0 or less, more preferably 12.0 or less, even more preferably 10.0 or less, and most preferably 8.0 or less in a mass ratio. If the blending ratio (the component (b)/the component (d)) of the component (b) to the component (d) falls within the above range, the obtained golf ball has better shot feeling on driver shots.

[(e) Organic Sulfur Compound]

The inner core layer rubber composition preferably further contains (e) an organic sulfur compound. If (e) the organic sulfur compound is contained, the obtained core has higher resilience.

As (e) the organic sulfur compound, at least one compound selected from the group consisting of thiols (thiophenols and thionaphthols), polysulfides, thiurams, thiocarboxylic acids, dithiocarboxylic acids, sulfenamides, dithiocarbamates and thiazoles is preferable.

Examples of the thiols include thiophenols and thionaphthols. Examples of the thiophenols include thiophenol; thiophenols substituted with a fluoro group, such as 4-fluorothiophenol, 2,4-difluorothiophenol, 2,5-difluorothiophenol, 2,6-difluorothiophenol, 2,4,5-trifluorothiophenol, and 2,4,5,6-tetrafluorothiophenol, pentafluorothiophenol; thiophenols substituted with a chloro group, such as 2-chlorothiophenol, 4-chlorothiophenol, 2,4-dichlorothiophenol, 2,5-dichlorothiophenol, 2,6-dichlorothiophenol, 2,4,5-trichlorothiophenol, 2,4,5,6-tetrachlorothiophenol, and pentachlorothiophenol; thiophenols substituted with a bromo group, such as 4-bromothiophenol, 2,4-dibromothiophenol, 2,5-dibromothiophenol, 2,6-dibromothiophenol, 2,4,5-tribromothiophenol, 2,4,5,6-tetrabromothiophenol, and pentabromothiophenol; thiophenols substituted with an iodo group, such as 4-iodothiophenol, 2,4-diiodothiophenol, 2,5-diiodothiophenol, 2,6-diiodothiophenol, 2,4,5-triiodothiophenol, and 2,4,5,6-tetraiodothiophenol, pentaiodothiophenol; and metal salts thereof. As the metal salt, a zinc salt is preferable. Examples of the thionaphthols (naphthalenethiols) include 2-thionaphthol, 1-thionaphthol, 1-chloro-2-thionaphthol, 2-chloro-1-thionaphthol, 1-bromo-2-thionaphthol, 2-bromo-1-thionaphthol, 1-fluoro-2-thionaphthol, 2-fluoro-1-thionaphthol, 1-cyano-2-thionaphthol, 2-cyano-1-thionaphthol, 1-acetyl-2-thionaphthol, 2-acetyl-1-thionaphthol, and a metal salt thereof. Preferable examples include 2-thionaphthol, 1-thionaphthol, and a metal salt thereof. The metal salt is preferably a divalent metal salt, more preferably a zinc salt. Specific examples of the metal salt include the zinc salt of 1-thionaphthol and the zinc salt of 2-thionaphthol.

The polysulfides are organic sulfur compounds having a polysulfide bond, and examples thereof include disulfides, trisulfides, and tetrasulfides. As the polysulfides, diphenylpolysulfides are preferable.

Examples of the diphenylpolysulfides include diphenyldisulfide; diphenyldisulfides substituted with a halogen group, such as bis(4-fluorophenyl)disulfide, bis(2,5-difluorophenyl)disulfide, bis(2,6-difluorophenyl)disulfide, bis(2,4,5-trifluorophenyl)disulfide, bis(2,4,5,6-tetrafluorophenyl)disulfide, bis(pentafluorophenyl)disulfide, bis(4-chlorophenyl)disulfide, bis(2,5-dichlorophenyl)disulfide, bis(2,6-dichlorophenyl)disulfide, bis(2,4,5-trichlorophenyl)disulfide, bis(2,4,5,6-tetrachlorophenyl)disulfide, bis(pentachlorophenyl)disulfide, bis(4-bromophenyl)disulfide, bis(2,5-dibromophenyl)disulfide, bis(2,6-dibromophenyl)disulfide, bis(2,4,5-tribromophenyl)disulfide, bis(2,4,5,6-tetrabromophenyl)disulfide, bis(pentabromophenyl)disulfide, bis(4-iodophenyl)disulfide, bis(2,5-diiodophenyl)disulfide, bis(2,6-diiodophenyl)disulfide, bis(2,4,5-triiodophenyl)disulfide, bis(2,4,5,6-tetraiodophenyl)disulfide, and bis(pentaiodophenyl)disulfide; and diphenyldisulfides substituted with an alkyl group, such as bis(4-methylphenyl)disulfide, bis(2,4,5-trimethylphenyl)disulfide, bis(pentamethylphenyl)disulfide, bis(4-t-butylphenyl)disulfide, bis(2,4,5-tri-t-butylphenyl)disulfide, and bis(penta-t-butylphenyl)disulfide.

Examples of the thiurams include thiuram monosulfides such as tetramethylthiuram monosulfide; thiuram disulfides such as tetramethylthiuram disulfide, tetraethylthiuram disulfide, and tetrabutylthiuram disulfide; and thiuram tetrasulfides such as dipentamethylenethiuram tetrasulfide. Examples of the thiocarboxylic acids include a naphthalene thiocarboxylic acid. Examples of the dithiocarboxylic acids include a naphthalene dithiocarboxylic acid. Examples of the sulfenamides include N-cyclohexyl-2-benzothiazole sulfenamide, N-oxydiethylene-2-benzothiazole sulfenamide, and N-t-butyl-2-benzothiazole sulfenamide.

(e) The organic sulfur compound is preferably thiophenols and/or the metal salt thereof, thionaphthols and/or the metal salt thereof, diphenyldisulfides, and thiuramdisulfides, more preferably 2,4-dichlorothiophenol, 2,6-difluorothiophenol, 2,6-dichlorothiophenol, 2,6-dibromothiophenol, 2,6-diiodothiophenol, 2,4,5-trichlorothiophenol, pentachlorothiophenol, 1-thionaphthol, 2-thionaphthol, diphenyldisulfide, bis(2,6-difluorophenyl)disulfide, bis(2,6-dichlorophenyl)disulfide, bis(2,6-dibromophenyl)disulfide, bis(2,6-diiodophenyl)disulfide, and bis(pentabromophenyl)disulfide.

(e) The organic sulfur compound may be used solely or in combination of at least two of them.

The amount of (e) the organic sulfur compound is preferably 0.05 part by mass or more, more preferably 0.1 part by mass or more, and even more preferably 0.2 part by mass or more, and is preferably 5.0 parts by mass or less, more preferably 3.0 parts by mass or less, and even more preferably 2.0 parts by mass or less, with respect to 100 parts by mass of (a) the base rubber. If the amount of (e) the organic sulfur compound is less than 0.05 part by mass, the effect of adding (e) the organic sulfur compound may not be obtained, and thus the resilience of the golf ball may not be improved. In addition, if the amount of (e) the organic sulfur compound is more than 5.0 parts by mass, the obtained golf ball may have an excessively large compression deformation amount, and thus the resilience thereof may be lowered.

[(f) Metal Compound]

In the case that the inner core layer rubber composition contains only the α,β-unsaturated carboxylic acid having 3 to 8 carbon atoms as the co-crosslinking agent, the inner core layer rubber composition preferably further contains (f) a metal compound. This is because neutralizing the α,β-unsaturated carboxylic acid having 3 to 8 carbon atoms with the metal compound in the inner core layer rubber composition provides substantially the same effect as using the metal salt of the α,β-unsaturated carboxylic acid having 3 to 8 carbon atoms as the co-crosslinking agent. It is noted that in case of using the α,β-unsaturated carboxylic acid having 3 to 8 carbon atoms and the metal salt thereof in combination as the co-crosslinking agent, (f) the metal compound may be used as an optional component.

(f) The metal compound is not particularly limited as long as it neutralizes (b) the α,β-unsaturated carboxylic acid having 3 to 8 carbon atoms in the inner core layer rubber composition. Examples of (f) the metal compound include a metal hydroxide such as magnesium hydroxide, zinc hydroxide, calcium hydroxide, sodium hydroxide, lithium hydroxide, potassium hydroxide, and copper hydroxide; a metal oxide such as magnesium oxide, calcium oxide, zinc oxide, and copper oxide; and a metal carbonate such as magnesium carbonate, zinc carbonate, calcium carbonate, sodium carbonate, lithium carbonate, and potassium carbonate. (f) The metal compound is preferably a divalent metal compound, more preferably a zinc compound. This is because the divalent metal compound reacts with the α,β-unsaturated carboxylic acid having 3 to 8 carbon atoms, thereby forming a metal crosslinking. Further, use of the zinc compound provides a golf ball with higher resilience.

(f) The metal compound may be used solely or in combination of two or more of them. In addition, the amount of (f) the metal compound may be appropriately adjusted in accordance with the desired neutralization degree of (b) the α,β-unsaturated carboxylic acid having 3 to 8 carbon atoms.

The inner core layer rubber composition used in the present invention may further contain additives such as a pigment, a filler for adjusting a weight or the like, an antioxidant, a peptizing agent, a softening agent or the like, where necessary.

The filler blended in the inner core layer rubber composition is used as a weight adjusting agent for mainly adjusting the weight of the golf ball obtained as a final product. The filler may be blended where necessary. Examples of the filler include an inorganic filler such as zinc oxide, barium sulfate, calcium carbonate, magnesium oxide, tungsten powder, and molybdenum powder. Zinc oxide is particularly preferably used as the filler. It is considered that zinc oxide functions as a vulcanization activator and increases the hardness of the entire core. The amount of the filler is preferably 0.5 part by mass or more, more preferably 1 part by mass or more, and is preferably 30 parts by mass or less, more preferably 25 parts by mass or less, and even more preferably 20 parts by mass or less, with respect to 100 parts by mass of (a) the base rubber. This is because if the amount of the filler is less than 0.5 part by mass, it is difficult to adjust the weight, while if the amount of the filler exceeds 30 parts by mass, the weight ratio of the rubber component is reduced and thus the resilience tends to be lowered.

The amount of the antioxidant is preferably 0.1 part by mass or more and 1 part by mass or less with respect to 100 parts by mass of (a) the base rubber. In addition, the amount of the peptizing agent is preferably 0.1 part by mass or more and 5 parts by mass or less with respect to 100 parts by mass of (a) the base rubber.

Next, the material for forming the outer core layer and the cover of the golf ball according to the present invention will be explained. Examples of the material for forming the outer core layer and the cover include (A) a thermoplastic resin composition and (B) a rubber composition. Among them, the outer core layer is preferably formed from (B) the rubber composition, and the cover is preferably formed from (A) the thermoplastic resin composition.

(A) Thermoplastic Resin Composition

First, the thermoplastic resin composition used in the present invention will be explained. The resin component contained in the thermoplastic resin composition is not particularly limited as long as it is thermoplastic. Examples of the thermoplastic resin include an ionomer resin, a thermoplastic olefin copolymer, a thermoplastic polyurethane resin, a thermoplastic polyamide resin, a thermoplastic styrene-based resin, a thermoplastic polyester resin, and a thermoplastic acrylic resin. Among these thermoplastic resins, a thermoplastic elastomer having rubber elasticity is preferable. Examples of the thermoplastic elastomer include a thermoplastic polyurethane elastomer, a thermoplastic polyamide elastomer, a thermoplastic styrene-based elastomer, a thermoplastic polyester elastomer, and a thermoplastic acrylic-based elastomer.

(A1) Ionomer Resin

Examples of the ionomer resin include an ionomer resin consisting of a metal ion-neutralized product of a binary copolymer composed of an olefin and an α,β-unsaturated carboxylic acid having 3 to 8 carbon atoms; an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester; and a mixture thereof.

It is noted that, in the present invention, "an ionomer resin consisting of a metal ion-neutralized product of a binary copolymer composed of an olefin and an α,β-unsaturated carboxylic acid having 3 to 8 carbon atoms" is sometimes simply referred to as "a binary ionomer resin", and "an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester" is sometimes simply referred to as "a ternary ionomer resin".

The olefin is preferably an olefin having 2 to 8 carbon atoms. Examples of the olefin include ethylene, propylene, butene, pentene, hexene, heptene and octene, and ethylene is particularly preferable. Examples of the α,β-unsaturated carboxylic acid having 3 to 8 carbon atoms include acrylic acid, methacrylic acid, fumaric acid, maleic acid and crotonic acid, and acrylic acid or methacrylic acid is particularly preferable. In addition, as the α,β-unsaturated carboxylic acid ester, methyl ester, ethyl ester, propyl ester, n-butyl ester, isobutyl ester or the like of acrylic acid, methacrylic acid, fumaric acid, maleic acid or the like can be used, and acrylic acid ester or methacrylic acid ester is particularly preferable.

As the binary ionomer resin, a metal ion-neutralized product of an ethylene-(meth)acrylic acid binary copolymer is preferable. As the ternary ionomer resin, a metal ion-neutralized product of a ternary copolymer composed of ethylene, (meth)acrylic acid and (meth)acrylic acid ester is preferable. Herein, (meth)acrylic acid means acrylic acid and/or methacrylic acid.

The amount of the α,β-unsaturated carboxylic acid component having 3 to 8 carbon atoms in the binary ionomer resin is preferably 15 mass % or more, more preferably 16 mass % or more, and even more preferably 17 mass % or more, and is preferably 30 mass % or less, more preferably 25 mass % or less. If the amount of the α,β-unsaturated carboxylic acid component having 3 to 8 carbon atoms is 15 mass % or more, the obtained constituent member is easily adjusted to a desired hardness. In addition, if the amount of the α,β-unsaturated carboxylic acid component having 3 to 8 carbon atoms is 30 mass % or less, the obtained constituent member is not excessively hard and hence has better durability and shot feeling.

The neutralization degree of the carboxyl groups of the binary ionomer resin is preferably 15 mole % or more, more preferably 20 mole % or more, and is preferably 100 mole % or less. If the neutralization degree is 15 mole % or more, the obtained golf ball has better resilience and durability. It is noted that the neutralization degree of the carboxyl groups of the binary ionomer resin may be calculated by the following expression. In addition, the metal component may be contained in such a manner that the theoretical neutralization degree of the carboxyl groups of the ionomer resin exceeds 100 mole %.

Neutralization degree of binary ionomer resin (mole %)=100×(mole number of neutralized carboxyl groups in binary ionomer resin/mole number of all carboxyl groups in binary ionomer resin)

Examples of the metal ion for neutralizing at least a part of carboxyl groups of the binary ionomer resin include a monovalent metal ion such as sodium, potassium and lithium; a divalent metal ion such as magnesium, calcium, zinc, barium and cadmium; a trivalent metal ion such as aluminum; and other ion such as tin and zirconium.

Specific examples of the binary ionomer resin in terms of trade names include "Himilan (registered trademark) (e.g. Himilan 1555 (Na), Himilan 1557 (Zn), Himilan 1605 (Na), Himilan 1706 (Zn), Himilan 1707 (Na), Himilan AM7311 (Mg), Himilan AM7329 (Zn)" available from Mitsui-Du Pont Polychemicals Co., Ltd.

Specific examples of the binary ionomer resin in terms of trade names further include "Surlyn (registered trademark) (e.g. Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li))" available from E.I. du Pont de Nemours and Company.

Examples of the ionomer resin available from ExxonMobil Chemical Corporation include "Iotek (registered trademark) (e.g. Iotek 8000 (Na), Iotek 8030 (Na), Iotek 7010 (Zn), Iotek 7030 (Zn))".

The above listed binary ionomer resins may be used solely or as a mixture of two or more of them. Na, Zn, Li, Mg and the like described in the parentheses after the trade names indicate metal types of neutralizing metal ions of the ionomer resins.

The amount of the $\alpha,\beta$-unsaturated carboxylic acid component having 3 to 8 carbon atoms in the ternary ionomer resin is preferably 2 mass % or more, more preferably 3 mass % or more, and is preferably 30 mass % or less, more preferably 25 mass % or less.

The neutralization degree of the carboxyl groups of the ternary ionomer resin is preferably 20 mole % or more, more preferably 30 mole % or more, and is preferably 100 mole % or less. If the neutralization degree is 20 mole % or more, the golf ball obtained by using the thermoplastic resin composition has better resilience and durability. It is noted that the neutralization degree of the carboxyl groups of the ionomer resin may be calculated by the following expression. In addition, the metal component may be contained in such a manner that the theoretical neutralization degree of the carboxyl groups of the ionomer resin exceeds 100 mole %.

Neutralization degree of ionomer resin (mole %)=100×(mole number of neutralized carboxyl groups in ionomer resin/mole number of all carboxyl groups in ionomer resin)

Examples of the metal ion for neutralizing at least a part of carboxyl groups of the ternary ionomer resin include a monovalent metal ion such as sodium, potassium and lithium; a divalent metal ion such as magnesium, calcium, zinc, barium and cadmium; a trivalent metal ion such as aluminum; and other ion such as tin and zirconium.

Specific examples of the ternary ionomer resin in terms of trade names include "Himilan (e.g. Himilan AM7327 (Zn), Himilan 1855 (Zn), Himilan 1856 (Na), Himilan AM7331 (Na))" available from Mitsui-Du Pont Polychemicals Co., Ltd. Further, examples of the ternary ionomer resin available from E.I. du Pont de Nemours and Company include "Surlyn 6320 (Mg), Surlyn 8120 (Na), Surlyn 8320 (Na), Surlyn 9320 (Zn), Surlyn 9320W (Zn), HPF1000 (Mg), HPF2000 (Mg), etc.)". In addition, Examples of the ternary ionomer resin available from ExxonMobil Chemical Corporation include "Iotek 7510 (Zn), Iotek 7520 (Zn), etc.)". It is noted that Na, Zn, Mg and the like described in the parentheses after the trade names indicate types of neutralizing metal ions. The ternary ionomer resin may be used solely, or two or more of them may be used in combination.

(A2) Thermoplastic Olefin Copolymer

Examples of the thermoplastic olefin copolymer include a binary copolymer composed of an olefin and an $\alpha,\beta$-unsaturated carboxylic acid having 3 to 8 carbon atoms; a ternary copolymer composed of an olefin, an $\alpha,\beta$-unsaturated carboxylic acid having 3 to 8 carbon atoms and an $\alpha,\beta$-unsaturated carboxylic acid ester; and a mixture thereof. The thermoplastic olefin copolymer is a non-ionic copolymer in which the carboxylic groups thereof are not neutralized.

It is noted that, in the present invention, "a binary copolymer composed of an olefin and an $\alpha,\beta$-unsaturated carboxylic acid having 3 to 8 carbon atoms" is sometimes simply referred to as "a binary copolymer", and "a ternary copolymer composed of an olefin, an $\alpha,\beta$-unsaturated carboxylic acid having 3 to 8 carbon atoms and an $\alpha,\beta$-unsaturated carboxylic acid ester" is sometimes simply referred to as "a ternary copolymer".

Examples of the olefin include those listed as the olefin constituting the ionomer resin. In particular, the olefin is preferably ethylene. Examples of the $\alpha,\beta$-unsaturated carboxylic acid having 3 to 8 carbon atoms and the ester thereof include those listed as the $\alpha,\beta$-unsaturated carboxylic acid having 3 to 8 carbon atoms and the ester thereof constituting the ionomer resin.

As the binary copolymer, a binary copolymer composed of ethylene and (meth)acrylic acid is preferable. As the ternary copolymer, a ternary copolymer composed of ethylene, (meth)acrylic acid and (meth)acrylic acid ester is preferable. Herein, (meth)acrylic acid means acrylic acid and/or methacrylic acid.

The amount of the $\alpha,\beta$-unsaturated carboxylic acid component having 3 to 8 carbon atoms in the binary copolymer or ternary copolymer is preferably 4 mass % or more, more preferably 5 mass % or more, and is preferably 30 mass % or less, more preferably 25 mass % or less.

Specific examples of the binary copolymer in terms of trade names include an ethylene-methacrylic acid copolymer in a trade name of "NUCREL (registered trademark) (e.g. "NUCREL N1050H", "NUCREL N2050H", "NUCREL N1110H", "NUCREL N0200H")" available from Mitsui-Du Pont Polychemicals Co., Ltd.; and an ethylene-acrylic acid copolymer in a trade name of "PRIMACOR (registered trademark) 59801" available from Dow Chemical Corporation.

Specific examples of the ternary copolymer in terms of trade names include trade name "NUCREL (e.g. "NUCREL AN4318" "NUCREL AN4319")" available from Mitsui-Du Pont Polychemicals Co., Ltd.; trade name "NUCREL (e.g. "NUCREL AE")" available from E.I. du Pont de Nemours and Company; and trade name "PRIMACOR (e.g. "PRIMACOR AT310", "PRIMACOR AT320")" available from Dow Chemical Corporation. The binary copolymer or ternary copolymer may be used solely, or two or more of them may be used in combination.

(A3) Thermoplastic Polyurethane Resin and Thermoplastic Polyurethane Elastomer

Examples of the thermoplastic polyurethane resin and the thermoplastic polyurethane elastomer include a thermoplastic resin and a thermoplastic elastomer which have a plurality of urethane bonds in the main chain of the molecule. As the polyurethane, a product obtained by a reaction between a polyisocyanate component and a polyol component is preferable. Examples of the thermoplastic polyurethane elastomer include trade names "Elastollan (registered trademark) XNY85A", "Elastollan XNY90A", "Elastollan XNY97A", "Elastollan ET885" and "Elastollan ET890" available from BASF Japan Ltd.

(A4) Thermoplastic Styrene-Based Elastomer

As the thermoplastic styrene-based elastomer, a thermoplastic elastomer containing a styrene block is suitably used. The styrene block-containing thermoplastic elastomer has a polystyrene block which is a hard segment, and a soft segment. Typical soft segment is a diene block. Examples of the constituent component of the diene block include butadiene, isoprene, 1,3-pentadiene and 2,3-dimethyl-1,3-butadiene. Butadiene and isoprene are preferable. Two or more of the constituent components may be used in combination.

Examples of the thermoplastic elastomer containing the styrene block include a styrene-butadiene-styrene block copolymer (SBS), a styrene-isoprene-styrene block copolymer (SIS), a styrene-isoprene-butadiene-styrene block copolymer (SIBS), a hydrogenated product of SBS, a hydrogenated product of SIS, and a hydrogenated product of SIBS. Examples of the hydrogenated product of SBS include a styrene-ethylene-butylene-styrene block copolymer (SEBS). Examples of the hydrogenated product of SIS include a styrene-ethylene-propylene-styrene block copolymer (SEPS). Examples of the hydrogenated product of SIBS include a styrene-ethylene-ethylene-propylene-styrene block copolymer (SEEPS).

The amount of the styrene component in the thermoplastic elastomer containing the styrene block is preferably 10 mass % or more, more preferably 12 mass % or more, and most preferably 15 mass % or more. From the viewpoint of the shot feeling of the obtained golf ball, the above amount is preferably 50 mass % or less, more preferably 47 mass % or less, and most preferably 45 mass % or less.

Examples of the thermoplastic elastomer containing the styrene block include an alloy of one member or at least two members selected from the group consisting of SBS, SIS, SIBS, SEBS, SEPS, SEEPS and hydrogenated products thereof with a polyolefin. It is estimated that the olefin component in the alloy contributes to the improvement in compatibility with the ionomer resin. If the alloy is used, the resilience performance of the golf ball is enhanced. An olefin having 2 to 10 carbon atoms is preferably used. Suitable examples of the olefin include ethylene, propylene, butene and pentene. Ethylene and propylene are particularly preferable.

Specific examples of the polymer alloy include "Rabalon (registered trademark) T3221C", "Rabalon T3339C", "Rabalon SJ4400N", "Rabalon SJ5400N", "Rabalon SJ6400N", "Rabalon SJ7400N", "Rabalon SJ8400N", "Rabalon SJ9400N" and "Rabalon SR04" available from Mitsubishi Chemical Corporation. Other specific examples of the thermoplastic elastomer containing the styrene block include "Epofriend A1010" available from Daicel Chemical Industry Co., Ltd., and "SEPTON HG-252" available from Kuraray Co., Ltd.

(A5) Thermoplastic Polyamide Resin and Thermoplastic Polyamide Elastomer

The thermoplastic polyamide is not particularly limited as long as it is a thermoplastic resin having a plurality of amide bonds (—NH—CO—) in the main chain of the molecule, and examples thereof include a product having amide bonds formed in the molecule through ring-opening polymerization of a lactam, or a reaction between a diamine component and a dicarboxylic acid component.

Examples of the polyamide resin include an aliphatic polyamide such as polyamide 6, polyamide 11, polyamide 12, polyamide 66, polyamide 610, polyamide 6T, polyamide 6I, polyamide 9T, polyamide M5T and polyamide 612; an aromatic polyamide such as poly-p-phenylene terephthalamide and poly-m-phenylene isophthalamide. These polyamides may be used solely, or two or more of them may be used in combination. Among them, the aliphatic polyamide such as polyamide 6, polyamide 66, polyamide 11 and polyamide 12 is preferable.

Specific examples of the polyamide resin in terms of trade names include "Rilsan (registered trademark) B (e.g. Rilsan BESN TL, Rilsan BESN P20 TL, Rilsan BESN P40 TL, Rilsan MB3610, Rilsan BMF O, Rilsan BMN O, Rilsan BMN O TLD, Rilsan BMN BK TLD, Rilsan BMN P20 D, Rilsan BMN P40 D)" available from Arkema K.K.

The polyamide elastomer has a hard segment portion composed of a polyamide component, and a soft segment portion. Examples of the soft segment portion of the polyamide elastomer include a polyether ester component and a polyether component. Examples of the polyamide elastomer include a polyether ester amide obtained by a reaction between a polyamide component (hard segment component) and a polyether ester component (soft segment component) which is formed from a polyoxyalkylene glycol and a dicarboxylic acid; and a polyether amide obtained by a reaction between a polyamide component (hard segment component) and a polyether component (soft segment component) which is formed from a dicarboxylic acid or diamine and a compound obtained by aminating or carboxylating both terminals of a polyoxyalkylene glycol.

Examples of the polyamide elastomer include "PEBAX (registered trademark) 2533", "PEBAX 3533", "PEBAX 4033" and "PEBAX 5533" available from Arkema K.K.

(A6) Thermoplastic Polyester Resin and Thermoplastic Polyester Elastomer

The thermoplastic polyester resin is not particularly limited as long as it has a plurality of ester bonds in the main chain of the molecule, and preferable examples thereof include a product obtained by a reaction between a dicarboxylic acid and a diol. Examples of the thermoplastic polyester elastomer include a block copolymer having a hard segment composed of a polyester component, and a soft segment. Examples of the polyester component constituting the hard segment include an aromatic polyester. Examples of the soft segment component include an aliphatic polyether and an aliphatic polyester.

Specific examples of the polyester elastomer include "Hytrel (registered trademark) 3548" and "Hytrel 4047" available from Du Pont-Toray Co., Ltd., and "Primalloy (registered trademark) A1606", "Primalloy B1600" and "Primalloy B1700" available from Mitsubishi Chemical Corporation.

(A7) Thermoplastic (meth)acrylic-Based Elastomer

Examples of the thermoplastic (meth)acrylic-based elastomer include a thermoplastic elastomer obtained by copolymerizing ethylene and (meth)acrylic acid ester. Specific examples of the thermoplastic (meth)acrylic-based elastomer include "KURARITY (a block copolymer of methyl methacrylate and butyl acrylate)" available from Kuraray Co., Ltd.

(B) Rubber Composition

Examples of the rubber composition include a rubber composition containing (a) a base rubber, (b) an α,β-unsaturated carboxylic acid having 3 to 8 carbon atoms and/or a metal salt thereof as a co-crosslinking agent, and (c) a crosslinking initiator. The rubber composition may further contain (e) an organic sulfur compound and/or (f) a metal compound where necessary. It is noted that, as (a) the base rubber, (b) the α,β-unsaturated carboxylic acid having 3 to 8 carbon atoms and/or the metal salt thereof as the co-crosslinking agent, (c) the crosslinking initiator, (e) the organic sulfur compound, and (f) the metal compound, the same materials as those exemplified for the inner core layer rubber composition can be used.

The outer core layer of the golf ball according to the present invention is preferably formed from the rubber composition.

The outer core layer and the cover may further contain an additive. Examples of the additive include a pigment component such as a white pigment (e.g. titanium oxide) and a blue pigment; a weight adjusting agent; a dispersant; an antioxidant; an ultraviolet absorber; a light stabilizer; and a fluorescent material or a fluorescent brightener. Examples of the weight adjusting agent include an inorganic filler such as zinc oxide, barium sulfate, calcium carbonate and magnesium oxide, tungsten powder and molybdenum powder.

The cover composition constituting the cover of the golf ball according to the present invention preferably contains, as a resin component, a thermoplastic polyurethane elastomer or an ionomer resin. In case of using the ionomer resin, it is preferable to use a thermoplastic styrene elastomer in combination. The amount of the polyurethane or ionomer resin in the resin component of the cover composition is preferably 50 mass % or more, more preferably 60 mass % or more, and even more preferably 70 mass % or more.

In addition to the above resin component, the cover composition may further contain a pigment component such as a white pigment (e.g. titanium oxide), a blue pigment and a red pigment; a weight adjusting agent such as zinc oxide, calcium carbonate and barium sulfate; a dispersant; an antioxidant; an ultraviolet absorber; a light stabilizer; a fluorescent material or a fluorescent brightener; and the like, as long as they do not impair the performance of the cover.

The amount of the white pigment (e.g. titanium oxide) is preferably 0.5 part by mass or more, more preferably 1 part by mass or more, and is preferably 10 parts by mass or less, more preferably 8 parts by mass or less, with respect to 100 parts by mass of the resin component constituting the cover. This is because if the amount of the white pigment is 0.5 part by mass or more, it is possible to impart the opacity to the cover, and if the amount of the white pigment is more than 10 parts by mass, the durability of the obtained cover may deteriorate.

[Production Method of Golf Ball]

Next, the method for producing the golf ball according to the present invention will be explained.

The inner core layer rubber composition is prepared, for example, by blending and kneading (a) the base rubber, (b) the α,β-unsaturated carboxylic acid having 3 to 8 carbon atoms and/or the metal salt thereof as the co-crosslinking agent, (c) the crosslinking initiator, and (d) the terpene-based resin. (e) The organic sulfur compound and/or (f) the metal compound may be blended in the inner core layer rubber composition where necessary. The kneading method is not particularly limited, and the kneading can be performed by using a conventional kneading machine such as a kneading roll, a banbury mixer or a kneader.

The material temperature of the inner core layer rubber composition when performing the kneading is preferably 80° C. or more, more preferably 90° C. or more, and is preferably 140° C. or less, more preferably 130° C. or less. The kneading time is preferably 6 min or more, more preferably 7 min or more, and is preferably 12 min or less, more preferably 10 min or less. If the kneading is performed under the above conditions, dispersion of the blended materials is more uniform.

The obtained kneaded inner core layer rubber composition is extruded with an extruder into a bar shape and cut into a predetermined length to produce a preform (also referred to as "plug"). Alternatively, the inner core layer rubber composition may be formed into a thick sheet shape, and stamped out to obtain a plug. The size of the plug may be changed as appropriate in accordance with the size of a mold for compression molding. Preferably, the obtained plugs are immersed, for example, in an anti-blocking agent solution such that the plugs are not attached to each other, dried, and then matured for about 8 to 48 hours. Subsequently, the plugs are charged into a mold for core molding, and pressed for molding.

In the present invention, it is preferable that the preform of the inner core layer rubber composition is pressed under the following conditions to mold the spherical inner core layer.

(1) The pressing pressure is preferably 1 MPa or more, more preferably 3 MPa or more, and is preferably 25 MPa or less, more preferably 15 MPa or less.

(2) The pressing temperature is preferably 125° C. or more, more preferably 150° C. or more, and is preferably 200° C. or less, more preferably 180° C. or less.

(3) The pressing time is preferably 15 min or more, more preferably 20 min or more, and is preferably 40 min or less, more preferably 30 min or less.

If the molding is performed under the above conditions, the production efficiency of the spherical inner core layer is higher. In other words, the spherical inner core layer having a low hardness difference between the surface hardness and the center hardness is obtained in a short time.

Subsequently, the outer core layer covering the inner core layer is formed. When the outer core layer is formed from (B) the rubber composition, examples of the method for forming the outer core layer include a method of molding the outer core layer rubber composition into hollow-shells and covering the inner core layer with a plurality of the shells followed by performing the compression molding (preferably a method of molding the outer core layer composition into half hollow-shells and covering the inner core layer with two of the half shells followed by performing the compression molding). Compression molding the outer core layer rubber composition into the half shells may be carried out, for example, under conditions of: a pressure of 1 MPa or more and 20 MPa or less and a molding temperature of 10° C. or more and 100° C. or less. Examples of the method for using the half shells to mold the outer core layer include a method of covering the inner core layer with two of the half shells followed by performing the compression molding. Compression molding the half shells into the outer core layer may be carried out, for example, under conditions of: a pressure of 2 MPa or more and 25 MPa or less and a molding temperature of 100° C. or more and 200° C. or less. If the molding is carried out under the above conditions, the outer core layer having a uniform thickness can be formed.

When the inner core layer is covered with the shells formed from the outer core layer rubber composition to form the outer core layer, a two-step heating pressing is also preferable. If the two-step heating pressing is adopted, the obtained inner core layer can have a lowered hardness difference between the surface hardness and the center hardness thereof. As the molding conditions in the first step, the following molding conditions are preferable.

(1) The pressing pressure is preferably 1 MPa or more, more preferably 3 MPa or more, and is preferably 25 MPa or less, more preferably 15 MPa or less.

(2) The pressing temperature is preferably 125° C. or more, more preferably 135° C. or more, and is preferably 180° C. or less, more preferably 150° C. or less.

(3) The pressing time is preferably 10 min or more, more preferably 15 min or more, and is preferably 40 min or less, more preferably 30 min or less.

As the molding conditions in the second step, the following molding conditions are preferable.

(1) The pressing pressure is preferably 1 MPa or more, more preferably 3 MPa or more, and is preferably 25 MPa or less, more preferably 15 MPa or less.

(2) The pressing temperature is preferably 140° C. or more, more preferably 150° C. or more, and is preferably 200° C. or less, more preferably 170° C. or less.

(3) The pressing time is preferably 5 min or more, more preferably 10 min or more, and is preferably 30 min or less, more preferably 15 min or less.

As the method for molding the outer core layer from (A) the thermoplastic resin composition, the same method as the method for molding the following cover of the golf ball can be adopted.

Examples of the method for molding the cover of the golf ball of the present invention include a method which comprises molding the cover composition into a hollow-shell, covering the core with a plurality of the hollow-shells and subjecting the core with a plurality of the hollow shells to the compression molding (preferably a method which comprises molding the cover composition into a half hollow-shell, covering the core with two of the half hollow-shells, and subjecting the core with two of the half hollow-shells to the compression molding); and a method which comprises injection molding the cover composition directly onto the core.

When molding the cover in the compression molding method, molding of the half shell may be conducted by either a compression molding method or an injection molding method, but the compression molding method is preferable. The compression molding of the cover composition into the half shell can be carried out, for example, under a pressure of 1 MPa or more and 20 MPa or less at a temperature of −20° C. or more and 70° C. or less relative to the flow beginning temperature of the cover composition. By performing the molding under the above conditions, a half shell having a uniform thickness is formed. Examples of the method for molding the cover using half shells include a method of covering the core with two of the half shells and then subjecting the core with two of the half shells to the compression molding. The compression molding of the half shells into the cover can be carried out, for example, under a pressure of 0.5 MPa or more and 25 MPa or less at a temperature of −20° C. or more and 70° C. or less relative to the flow beginning temperature of the cover composition. By performing the molding under the above conditions, a golf ball cover having a uniform thickness is formed.

In case of injection molding the cover composition into the cover, the cover composition extruded in a pellet form beforehand may be used for the injection molding, or the cover materials such as the base resin components and the pigment may be dry blended, followed by directly injection molding the blended material. It is preferable to use upper and lower molds having a hemispherical cavity and pimples for forming the cover, wherein a part of the pimples also serves as a retractable hold pin. When molding the cover by the injection molding, the hold pin is protruded to hold the core, and the cover composition is charged and then cooled to obtain the cover. For example, the molding of the cover may be conducted as follows: the cover composition heated to a temperature ranging from 200° C. to 250° C. is charged for 0.5 to 5 seconds into a mold held under a pressure of 9 MPa to 15 MPa, and after cooling for 10 to 60 seconds, the mold is opened.

The golf ball body having the cover formed thereon is ejected from the mold, and is preferably subjected to surface treatments such as deburring, cleaning and sandblast where necessary. In addition, if desired, a paint film or a mark may be formed.

[Golf Ball]

The construction of the golf ball according to the present invention is not particularly limited, as long as the golf ball comprises a spherical core composed of an inner core layer and an outer core layer, and one or more cover covering the spherical core. The FIGURE is a partially cutaway cross-sectional view of a golf ball 2 according to one embodiment of the present invention. The golf ball 2 comprises a spherical core 7 composed of an inner core layer 4 and an outer core layer 6 covering the inner core layer 4, and a cover 12 covering the spherical core 7. A plurality of dimples 14 are formed on the surface of the cover 12. Other portion than the dimples 14 on the surface of the golf ball is a land 16. The golf ball is provided with a paint layer and a mark layer outside the cover, but these layers are not depicted.

The surface hardness (Hs1) of the inner core layer of the golf ball according to the present invention is preferably 40 or more, more preferably 50 or more, and even more preferably 60 or more, and is preferably 90 or less, more preferably 80 or less, and even more preferably 70 or less in Shore C hardness. If the surface hardness (Hs1) is 40 or more in Shore C hardness, the inner core layer has better resilience. In addition, if the surface hardness (Hs1) of the inner core layer is 90 or less in Shore C hardness, the shot feeling on driver shots is further enhanced.

The center hardness (Ho) of the inner core layer is preferably 40 or more, more preferably 50 or more, and even more preferably 60 or more in Shore C hardness. If the center hardness (Ho) of the inner core layer is 40 or more in Shore C hardness, the inner core layer is not excessively soft and hence has better resilience. In addition, the center hardness (Ho) of the inner core layer is preferably 90 or less, more preferably 80 or less, and even more preferably 70 or less in Shore C hardness. If the center hardness (Ho) is 90 or less in Shore C hardness, the inner core layer is not excessively hard and hence has better shot feeling.

The hardness difference (Hs1−Ho) between the surface hardness (Hs1) and the center hardness (Ho) of the inner core layer is preferably −20 or more, more preferably −10 or more, and even more preferably 0 or more, and is preferably 20 or less, more preferably 15 or less, and even more preferably 10 or less in Shore C hardness. If the hardness difference (Hs1−Ho) between the surface hardness (Hs1) and the center hardness (Ho) of the inner core layer is 0 or more in Shore C hardness, the obtained golf ball has better resilience. In addition, if the hardness difference (Hs1−Ho) between the surface hardness (Hs1) and the center hardness (Ho) of the inner core layer is 10 or less in Shore C hardness, the obtained golf ball has enhanced durability.

The inner core layer is preferably spherical. The diameter of the inner core layer of the golf ball according to the present invention is preferably 5 mm or more, more preferably 10 mm or more, and even more preferably 20 mm or more, and is preferably 35 mm or less, more preferably 30 mm or less, and even more preferably 25 mm or less. If the diameter of the inner core layer falls within the above range, the obtained golf ball has enhanced durability.

When the inner core layer has a diameter in a range of from 10 mm to 25 mm, the compression deformation amount of the inner core layer (shrinking amount of the inner core layer along the compression direction) when applying a load from 98 N as an initial load to 294 N as a final load to the inner core layer is preferably 0.8 mm or more, more preferably 0.9 mm or more, and even more preferably 1.0 mm or more, and is preferably 1.5 mm or less, more preferably 1.4 mm or less, and even more preferably 1.3 mm or less. If the above compression deformation amount is 0.8 mm or more, the shot feeling is better, and if the above compression deformation amount is 1.5 mm or less, the resilience is better.

In the golf ball according to the present invention, the thickness of the outer core layer is preferably 2.5 mm or more, more preferably 5 mm or more, and even more preferably 7.5 mm or more, and is preferably 17.5 mm or less, more preferably 15 mm or less, and even more preferably 12.5 mm or less. If the thickness of the outer core layer falls within the above range, a good balance can be achieved between the resilience and the durability.

The surface hardness (Hs2) of the outer core layer is preferably 50 or more, more preferably 60 or more, and even more preferably 70 or more in Shore C hardness. If the surface hardness (Hs2) of the outer core layer is 70 or more in Shore C hardness, the spherical core has an outer-hard and inner-soft structure. The spherical core having the outer-hard and inner-soft structure has a lowered spin rate on driver shots. In addition, from the viewpoint of the durability, the surface hardness (Hs2) of the outer core layer is preferably 100 or less, more preferably 95 or less, and even more preferably 90 or less in Shore C hardness.

The hardness difference (Hs2−Ho) between the surface hardness (Hs2) and the center hardness (Ho) of the spherical core composed of the inner core layer and the outer core layer is preferably −20 or more, more preferably −10 or more, and even more preferably 0 or more, and is preferably 20 or less, more preferably 15 or less, and even more preferably 10 or less in Shore C hardness. If the hardness difference (Hs2−Ho) between the surface hardness (Hs2) and the center hardness (Ho) of the spherical core is 0 or more in Shore C hardness, the obtained golf ball has better resilience. In addition, if the hardness difference (Hs2−Ho) between the surface hardness (Hs2) and the center hardness (Ho) of the spherical core is 10 or less in Shore C hardness, the obtained golf ball has enhanced durability.

The thickness of the cover of the golf ball according to the present invention is preferably 4.0 mm or less, more preferably 3.0 mm or less, and even more preferably 2.0 mm or less. If the thickness of the cover is 4.0 mm or less, the resilience and shot feeling of the obtained golf ball become better. The thickness of the cover is preferably 0.3 mm or more, more preferably 0.5 mm or more, even more preferably 0.8 mm or more, and most preferably 1.0 mm or more. If the thickness of the cover is less than 0.3 mm, the durability and wear resistance of the cover may deteriorate. In the case that the cover has a plurality of layers, it is preferable that the total thickness of the cover layers falls within the above range.

Concave portions called "dimple" are usually formed on the surface of the cover of the golf ball according to the present invention. The total number of dimples formed on the cover is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, a polygonal shape such as a roughly triangular shape, a roughly quadrangular shape, a roughly pentagonal shape, a roughly hexagonal shape, and other irregular shape. The shape of dimples is employed solely or at least two of them may be used in combination.

It is preferable that the material hardness (slab hardness) of the outermost cover of the golf ball according to the present invention is appropriately set in accordance with the desired performance of the golf ball. For example, in case of a so-called distance golf ball which focuses on a flight distance, the material hardness of the outermost cover composition is preferably 50 or more, more preferably 55 or more, and even more preferably 60 or more, and is preferably 80 or less, more preferably 70 or less, and even more preferably 68 or less in Shore D hardness. If the material hardness of the outermost cover is 50 or more, the obtained golf ball has a higher launch angle and a lower spin rate on driver shots and iron shots, and thus travels a greater flight distance. In addition, if the material hardness of the outermost cover is 80 or less, the obtained golf ball has better durability. In addition, in case of a so-called spin golf ball which focuses on controllability, the material hardness of the outermost cover is preferably less than 50, and is preferably 20 or more, more preferably 25 or more, and even more preferably 30 or more in Shore D hardness. If the slab hardness of the outermost cover is less than 50 in Shore D hardness, the obtained golf ball readily stops on the green due to the high spin rate on approach shots. In addition, the material hardness of the outermost cover is 20 or more, the abrasion resistance is enhanced. In case of a plurality of cover layers, the slab hardness of the cover composition constituting each layer may be identical to or different from each other.

The golf ball according to the present invention preferably has a paint film on the surface of the golf ball body. The paint film preferably has a thickness of, but is not particularly limited to, 5 μm or more, more preferably 7 μm or more, and preferably has a thickness of 50 μm or less, more preferably 40 μm or less, even more preferably 30 μm or less. If the thickness of the paint film is less than 5 μm, the paint film is easy to wear off due to the continued use of the golf ball, and if the thickness of the paint film exceeds 50 μm, the dimple effect is reduced and thus the flight performance of the golf ball may be lowered.

The golf ball of the present invention preferably has a diameter in a range from 40 mm to 45 mm. In light of satisfying a regulation of US Golf Association (USGA), the diameter is particularly preferably 42.67 mm or more. In light of prevention of air resistance, the diameter is more preferably 44 mm or less, particularly preferably 42.80 mm or less. In addition, the golf ball of the present invention preferably has a mass of 40 g or more and 50 g or less. In light of obtaining greater inertia, the mass is more preferably 44 g or more, particularly preferably 45.00 g or more. In light of satisfying a regulation of USGA, the mass is particularly preferably 45.93 g or less.

When the golf ball of the present invention has a diameter in a range from 40 mm to 45 mm, the compression deformation amount of the golf ball (shrinking amount of the golf ball along the compression direction) when applying a load from 98 N as an initial load to 1275 N as a final load to the golf ball is preferably 2.0 mm or more, more preferably 2.3 mm or more, and even more preferably 2.5 mm or more, and is preferably 4.0 mm or less, more preferably 3.3 mm or less, and even more preferably 3.5 mm or less. If the compression deformation amount is 2.0 mm or more, the golf ball does not become excessively hard, and thus the shot feeling thereof becomes better. On the other hand, if the compression deformation amount is 4.0 mm or less, the resilience of the golf ball becomes higher.

EXAMPLES

Next, the present invention will be described in detail by way of examples. However, the present invention is not limited to the examples described below. Various changes and modifications without departing from the spirit of the present invention are included in the scope of the present invention.

[Evaluation Methods]

(1) Compression Deformation Amount

A compression deformation amount of the core or golf ball (a shrinking amount of the core or golf ball along the compression direction), when applying a load from an initial load of 98 N to a final load of 294 N or 1275 N to the core or golf ball, was measured.

(2) Core Hardness (Shore C Hardness)

The Shore C hardness measured with an automatic hardness tester Digitest II available from Bareiss company at the surface of the core was adopted as the surface hardness of the core. In addition, the core was cut into two hemispheres to obtain a cut plane, and the hardness at the central point of the cut plane was measured.

(3) Slab Hardness (Shore D Hardness)

Sheets with a thickness of about 2 mm were produced by injection molding the composition for forming the cover. The sheets were stored at 23° C. for two weeks. At least three of these sheets were stacked on one another so as not to be affected by the measuring substrate on which the sheets were placed, and the hardness of the stack was measured with an automatic hardness tester (Digitest II, available from Bareiss company) using a testing device of "Shore D".

(4) Durability

A W #1 driver provided with a metal head (XXIO S, loft angel: 11° available from Dunlop Sports Limited) was installed on a swing robot M/C available from Golf Laboratories, Inc. The golf ball was hit repeatedly at a head speed of 45 m/sec until a crack occurred, and the hitting number when the crack occurred was counted. It is noted that the measurement was conducted using twelve samples for each golf ball, and the average value thereof was adopted as the hitting number for that golf ball. It is noted that the hitting number of the golf ball No. 1 was defined as 100, and the durability of each golf ball was represented by converting the hitting number of each golf ball into this index.

[Production of Golf Ball]

(1) Production of Inner Core Layer

According to the formulations shown in Table 1, the inner core layer rubber compositions were kneaded with a kneading roll, and heat pressed in upper and lower molds, each having a hemispherical cavity, under predetermined conditions to obtain spherical inner core layers having a diameter of 20 mm. It is noted that the blended amount of barium sulfate was adjusted such that the finally obtained golf balls had a mass of 45.5 g.

TABLE 1

| | | Golf ball No. | 1 | 2 | 3 | 4 | 5 | 6 | 7 | 8 | 9 |
|---|---|---|---|---|---|---|---|---|---|---|---|
| Inner core layer rubber composition | Formulation (parts by mass) | (a) BR730 | 100 | 100 | 100 | 100 | 100 | 100 | 100 | 100 | 100 |
| | | (b) ZN-DA90S | 19.0 | 18.0 | 32.0 | 35.0 | 47.0 | 32.0 | 35.0 | 26.0 | 29.0 |
| | | (c) Dicumyl peroxide | 0.3 | 0.8 | 0.8 | 1.0 | 1.0 | 0.8 | 1.0 | 0.8 | 1.0 |
| | | (d) Sylvares TP2019 | 0 | 0 | 10 | 15 | 30 | — | — | — | — |
| | | (d) YS RESIN PX 1150N | — | — | — | — | — | 10 | 15 | — | — |
| | | (d) Sylvares 6720 | — | — | — | — | — | — | — | 10 | 15 |
| | | (f) Zinc oxide | 5.0 | 5.0 | 5.0 | 5.0 | 5.0 | 5.0 | 5.0 | 5.0 | 5.0 |
| | | Barium sulfate | *) | *) | *) | *) | *) | *) | *) | *) | *) |
| | Blending ratio (b)/(d) of component (b) to component (d) | | — | — | 3.2 | 2.3 | 1.6 | 3.2 | 2.3 | 2.6 | 1.9 |
| | Softening point of component (d) (° C.) | | — | — | 125 | 125 | 125 | 115 | 115 | 118 | 118 |
| Crosslinking conditions | Pressing temperature (° C.) | | 160 | 130 | 170 | 170 | 170 | 170 | 170 | 170 | 170 |
| | Pressing time (min) | | 20 | 60 | 30 | 20 | 20 | 20 | 20 | 20 | 20 |
| | Pressing pressure (MPa) | | 9.8 | 9.8 | 9.8 | 9.8 | 9.8 | 9.8 | 9.8 | 9.8 | 9.8 |
| Inner core layer | Diameter of inner core layer (mm) | | 20 | 20 | 20 | 20 | 20 | 20 | 20 | 20 | 20 |
| | Compression deformation amount (mm) | | 1.5 | 1.3 | 1.3 | 1.3 | 1.3 | 1.3 | 1.3 | 1.3 | 1.3 |
| | Center hardness Ho (Shore C) | | 53.0 | 65.0 | 66.0 | 66.0 | 66.0 | 63.0 | 63.0 | 59.0 | 59.0 |
| | Surface hardness Hs1 (Shore C) | | 66.0 | 66.0 | 66.0 | 66.0 | 66.0 | 66.0 | 66.0 | 66.0 | 66.0 |
| | Hs1 − Ho | | 13.0 | 1.0 | 0.0 | 0.0 | 0.0 | 3.0 | 3.0 | 7.0 | 7.0 |

*): Appropriate amount

The materials used in Table 1 are shown below.

BR730: high-cis polybutadiene rubber (amount of cis-1,4 bond=95 mass %, amount of 1,2-vinyl bond=1.3 mass %, Moony viscosity ($ML_{1+4}$ (100° C.)=55, molecular weight distribution (Mw/Mn)=3) available from JSR Corporation ZN-DA90S: zinc acrylate available from Nisshoku Techno Fine Chemical Co., Ltd.

Dicumyl peroxide: available from Tokyo Chemical Industry Co., Ltd.

Sylvares TP2019 (pinene-phenol copolymer, softening point: 125° C.): available from KRATON CORPORATION Sylvares 6720 (pinene-α-methylstyrene-phenol copolymer, softening point: 118° C.) available from KRATON CORPORATION YS RESIN PX 1150N (β-pinene polymer, softening point: 115±5° C.): available from Yasuhara Chemical Co. Ltd.

Zinc oxide: "Ginrei R" available from Toho Zinc Co., Ltd.

Barium sulfate: "Barium Sulfate BD" available from Sakai Chemical Industry Co., Ltd.

(2) Production of Outer Core Layer

According to the formulations shown in Table 2, the outer core layer rubber compositions were kneaded to mold the half shells from the outer core layer rubber compositions. The molding of the half shells was conducted by charging the outer core layer rubber compositions into each of the depressed part of the lower mold of the mold for molding half shell followed by applying a pressure. The compression molding was conducted under conditions of a molding temperature: 25° C., a molding time: 3 min and a molding pressure: 15 MPa. The above obtained inner core layer was covered with two of the half shells. The inner core layer and the half shells were charged together into a mold consisting of upper and lower molds having a hemispherical cavity, and heat pressed under predetermined conditions to obtain spherical cores (thickness of outer core layer: 9 mm). It is noted that the blended amount of barium sulfate was adjusted such that the finally obtained golf balls had a mass of 45.5 g.

The materials used in Table 2 are shown below.

BR730: high-cis polybutadiene rubber (amount of cis-1,4 bond=95 mass %, amount of 1,2-vinyl bond=1.3 mass %, Moony viscosity ($ML_{1+4}$ (100° C.)=55, molecular weight distribution (Mw/Mn)=3) available from JSR Corporation IR2200: isoprene rubber available from Zeon Corporation ZN-DA90S: zinc acrylate available from Nisshoku Techno Fine Chemical Co., Ltd.

Dicumyl peroxide: available from Tokyo Chemical Industry Co., Ltd.

Zinc oxide: "Ginrei R" available from Toho Zinc Co., Ltd.

Barium sulfate: "Barium Sulfate BD" available from Sakai Chemical Industry Co., Ltd.

DPDS: diphenyl disulfide available from Sumitomo Seika Chemicals Co., Ltd.

H-BHT: 2,6-di-tert-butyl-4-methylphenol (3) Production of Cover

Cover materials having the formulation shown in Table 3 were extruded with a twin-screw kneading extruder to prepare a cover composition in a pellet form. The extruding conditions of the cover composition were a screw diameter of 45 mm, a screw rotational speed of 200 rpm, and screw L/D=35, and the mixture was heated to 160 to 230° C. at the die position of the extruder. The obtained cover composition was injection molded onto the spherical core obtained above to produce a golf ball comprising a spherical core and a cover (thickness: 2.3 mm) covering the spherical core. Evaluation results of the obtained golf balls are shown in Table 2.

TABLE 3

|  | Cover composition No. 1 |
| --- | --- |
| Himilan 1555 | 40 |
| Himilan 1605 | 20 |
| Himilan AM7329 | 40 |
| Titanium dioxide (A220) | 3 |
| JF-90 | 0.2 |
| Hardness (Shore D) | 63 |

Formulation: parts by mass

The materials used in Table 3 are shown below.

TABLE 2

| Golf ball No. | | | 1 | 2 | 3 | 4 | 5 | 6 | 7 | 8 | 9 |
| --- | --- | --- | --- | --- | --- | --- | --- | --- | --- | --- | --- |
| Outer core layer rubber composition | Formulation (parts by mass) | (a) BR730 | 62 | 100 | 100 | 100 | 100 | 100 | 100 | 100 | 100 |
|  |  | (a) IR2200 | 38 | — | — | — | — | — | — | — | — |
|  |  | H-BHT | 0.1 | 0.1 | 0.1 | 0.1 | 0.1 | 0.1 | 0.1 | 0.1 | 0.1 |
|  |  | (b) ZN-DA90S | — | — | 35.5 | 35.5 | 35.5 | 35.5 | 35.5 | 35.5 | 35.5 |
|  |  | (f) Zinc oxide | 5 | 5 | 5 | 5 | 5 | 5 | 5 | 5 | 5 |
|  |  | Barium sulfate | *) | *) | *) | *) | *) | *) | *) | *) | *) |
|  |  | (c) Dicumyl peroxide | 0.7 | 0.7 | 0.7 | 0.7 | 0.7 | 0.7 | 0.7 | 0.7 | 0.7 |
|  |  | DPDS | 0.5 | 0.5 | 0.5 | 0.5 | 0.5 | 0.5 | 0.5 | 0.5 | 0.5 |
| Outer core layer crosslinking conditions | First pressing temperature (° C.) | | 142 | 142 | 142 | 142 | 142 | 142 | 142 | 142 | 142 |
|  | First pressing time (min) | | 16 | 16 | 16 | 16 | 16 | 16 | 16 | 16 | 16 |
|  | First pressing pressure (MPa) | | 9.8 | 9.8 | 9.8 | 9.8 | 9.8 | 9.8 | 9.8 | 9.8 | 9.8 |
|  | Second pressing temperature (° C.) | | 160 | 160 | 160 | 160 | 160 | 160 | 160 | 160 | 160 |
|  | Second pressing time (min) | | 10 | 10 | 10 | 10 | 10 | 10 | 10 | 10 | 10 |
|  | Second pressing pressure (MPa) | | 9.8 | 9.8 | 9.8 | 9.8 | 9.8 | 9.8 | 9.8 | 9.8 | 9.8 |
| Spherical core | Thickness of outer core layer (mm) | | 9.50 | 9.50 | 9.50 | 9.50 | 9.50 | 9.50 | 9.50 | 9.50 | 9.50 |
|  | Surface hardness Hs2 of outer core layer (Shore C) | | 71.0 | 76.0 | 76.0 | 75.0 | 75.0 | 76.0 | 75.0 | 75.0 | 75.0 |
|  | Compression deformation amount (mm) | | 3.7 | 3.4 | 3.5 | 3.5 | 3.5 | 3.5 | 3.5 | 3.5 | 3.5 |
| Golf ball | Thickness of cover (mm) | | 1.50 | 1.50 | 1.50 | 1.50 | 1.50 | 1.50 | 1.50 | 1.50 | 1.50 |
|  | Compression deformation amount (mm) | | 3.3 | 3.0 | 3.1 | 3.1 | 3.1 | 3.1 | 3.1 | 3.1 | 3.1 |
|  | Durability | | 100 | 105 | 107 | 118 | 78 | 108 | 115 | 103 | 111 |

*): Appropriate amount

Himilan 1555: Na-neutralized ionomer available from Du Pont-Mitsui Polychemicals Co., Ltd.

Himilan 1605: Na-neutralized ionomer available from Du Pont-Mitsui Polychemicals Co., Ltd.

Himilan AM7329: Zn-neutralized ionomer available from Du Pont-Mitsui Polychemicals Co., Ltd.

A220: titanium dioxide available from Ishihara Sangyo Kaisha, Ltd.

JF-90: light stabilizer available from Johoku chemical Co., Ltd.

As shown in Table 2, according to the present invention, the production efficiency of the spherical core having a low hardness difference between the surface hardness and the center hardness is improved. In addition, the golf ball according to the present invention is excellent in durability.

The present invention is useful as a method for producing a golf ball.

This application is based on Japanese patent application No. 2018-204319 filed on Oct. 30, 2018, the content of which is hereby incorporated by reference.

The invention claimed is:

1. A golf ball comprising a spherical core composed of an inner core layer and an outer core layer, and at least one cover layer covering the spherical core, wherein the inner core layer is formed from an inner core layer rubber composition containing:
   (a) a base rubber,
   (b) an $\alpha,\beta$-unsaturated carboxylic acid having 3 to 8 carbon atoms and/or a metal salt thereof as a co-crosslinking agent,
   (c) a crosslinking initiator, and
   (d) a terpene-based resin,
      wherein (d) the terpene-based resin includes at least one member selected from the group consisting of a terpene-phenol copolymer, a terpene-styrene copolymer, a terpene-phenol-styrene copolymer, a hydrogenated terpene-phenol copolymer, a hydrogenated terpene-styrene copolymer, and a hydrogenated terpene-phenol-styrene copolymer, and
      the inner core layer rubber composition contains (d) the terpene-based resin in an amount of from 3 parts by mass to 20 parts by mass with respect to 100 parts by mass of (a) the base rubber.

2. The golf ball according to claim 1, wherein (d) the terpene-based resin is at least one member selected from the group consisting of compounds having a structure represented by the following formulae (1) and (2):

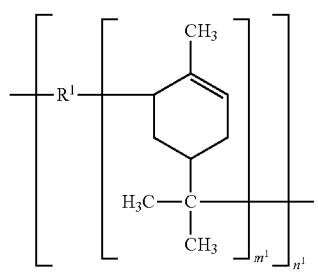

and

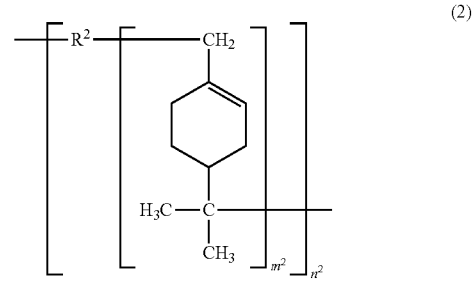

wherein in the formulae (1) and (2), $R^1$ and $R^2$ each independently represent a divalent residue of a phenol-based compound and/or a styrene-based compound, $m^1$ to $m^2$ each independently represent a natural number of 1 to 30, and $n^1$ to $n^2$ each independently represent a natural number of 1 to 20.

3. The golf ball according to claim 1, wherein (d) the terpene-based resin has a softening point in a range of from 60° C. to 150° C.

4. The golf ball according to claim 1, wherein a blending ratio (component (b)/component (d)) of the component (b) to the component (d) ranges from 2.0 to 15.0 in a mass ratio.

5. The golf ball according to claim 1, wherein the base rubber contains a high-cis polybutadiene having a cis-1,4 bond in a proportion of 90 mass % or more.

6. The golf ball according to claim 1, wherein a hardness difference (Hs1−Ho) between a center hardness (Ho) of the inner core layer and a surface hardness (Hs1) of the inner core layer is 10 or less in Shore C hardness.

7. The golf ball according to claim 1, wherein the outer core layer is formed from a rubber composition.

8. The golf ball according to claim 7, wherein the rubber composition for the outer core layer contains (a) a base rubber, (b) an $\alpha,\beta$-unsaturated carboxylic acid having 3 to 8 carbon atoms and/or a metal salt thereof as a co-crosslinking agent, and (c) a crosslinking initiator.

9. The golf ball according to claim 8, wherein the rubber composition for the outer core layer does not contain a terpene-based resin.

10. The golf ball according to claim 1, wherein a center hardness (Ho) of the inner core layer ranges from 40 to 90 in Shore C hardness, and a surface hardness (Hs1) of the inner core layer ranges from 40 to 90 in Shore C hardness.

11. The golf ball according to claim 1, wherein a diameter of the inner core layer ranges from 5 mm to 35 mm, and a thickness of the outer core layer ranges from 2.5 mm to 17.5 mm.

12. The golf ball according to claim 1, wherein a surface hardness (Hs2) of the outer core layer ranges from 50 to 100 in Shore C hardness.

13. The golf ball according to claim 1, wherein a hardness difference (Hs2−Ho) between a surface hardness (Hs2) and a center hardness (Ho) of the spherical core ranges from −20 to 20 in Shore C hardness.

14. A golf ball comprising a spherical core composed of an inner core layer and an outer core layer, and at least one cover covering the spherical core, wherein
the inner core layer is formed from an inner core layer rubber composition containing:
(a) a base rubber,
(b) an α,β-unsaturated carboxylic acid having 3 to 8 carbon atoms and/or a metal salt thereof as a co-crosslinking agent,
(c) a crosslinking initiator, and
(d) a terpene-based resin; and
a diameter of the inner core layer is 5 mm or more and less than 25 mm.

15. The golf ball according to claim 14, wherein (d) the terpene-based resin includes at least one member selected from the group consisting of a terpene polymer, a terpene-phenol copolymer, a terpene-styrene copolymer, a terpene-phenol-styrene copolymer, a hydrogenated terpene-phenol copolymer, a hydrogenated terpene-styrene copolymer, and a hydrogenated terpene-phenol-styrene copolymer.

16. The golf ball according to claim 14, wherein the inner core layer rubber composition contains (d) the terpene-based resin in an amount of from 3 parts by mass to 20 parts by mass with respect to 100 parts by mass of (a) the base rubber.

17. The golf ball according to claim 14, wherein a hardness difference (Hs1−Ho) between a center hardness (Ho) of the inner core layer and a surface hardness (Hs1) of the inner core layer is 10 or less in Shore C hardness.

18. A golf ball comprising a spherical core composed of an inner core layer and an outer core layer, and at least one cover covering the spherical core, wherein
the inner core layer is formed from an inner core layer rubber composition consisting of:
(a) a base rubber,
(b) an α,β-unsaturated carboxylic acid having 3 to 8 carbon atoms and/or a metal salt thereof as a co-crosslinking agent,
(c) a crosslinking initiator, and
(d) a terpene-based resin, and
optionally at least one component selected from the group consisting of
an organic sulfur compound,
a metal hydroxide,
a metal oxide selected from magnesium oxide, calcium oxide, zinc oxide, and copper oxide,
a metal carbonate,
barium sulfate,
tungsten powder,
molybdenum powder,
a pigment,
an antioxidant,
a peptizing agent, and
a softening agent; and
a hardness difference (Hs1−Ho) between a center hardness (Ho) of the inner core layer and a surface hardness (Hs1) of the inner core layer is 10 or less in Shore C hardness.

19. The golf ball according to claim 18, wherein (d) the terpene-based resin includes at least one member selected from the group consisting of a terpene polymer, a terpene-phenol copolymer, a terpene-styrene copolymer, a terpene-phenol-styrene copolymer, a hydrogenated terpene-phenol copolymer, a hydrogenated terpene-styrene copolymer, and a hydrogenated terpene-phenol-styrene copolymer.

20. The golf ball according to claim 18, wherein the inner core layer rubber composition contains (d) the terpene-based resin in an amount of from 3 parts by mass to 20 parts by mass with respect to 100 parts by mass of (a) the base rubber.

21. The golf ball according to claim 18, wherein a diameter of the inner core layer ranges from 5 mm to 35 mm, and a thickness of the outer core layer ranges from 2.5 mm to 17.5 mm.

* * * * *